(12) United States Patent
Kashi

(10) Patent No.: US 8,413,254 B2
(45) Date of Patent: Apr. 2, 2013

(54) CONTENT REPRODUCING APPARATUS AND PROGRAM OF THE SAME

(75) Inventor: Shuntaro Kashi, Neyagawa (JP)

(73) Assignee: Onkyo Corporation, Osaka (JP)

( * ) Notice: Subject to any disclaimer, the term of this patent is extended or adjusted under 35 U.S.C. 154(b) by 141 days.

(21) Appl. No.: 13/025,308

(22) Filed: Feb. 11, 2011

(65) Prior Publication Data

US 2011/0246771 A1    Oct. 6, 2011

(30) Foreign Application Priority Data

Apr. 2, 2010   (JP) .................................. 2010-85645
Nov. 8, 2010   (JP) ................................ 2010-249342

(51) Int. Cl.
   *H04L 29/06* (2006.01)
(52) U.S. Cl. ........................ 726/26; 380/279; 713/168
(58) Field of Classification Search .................. 713/168; 726/26; 380/279
   See application file for complete search history.

(56) References Cited

U.S. PATENT DOCUMENTS

| | | | | |
|---|---|---|---|---|
| 7,165,175 | B1* | 1/2007 | Kollmyer et al. | 713/154 |
| 2001/0022536 | A1* | 9/2001 | Kallio et al. | 331/1 R |
| 2002/0172368 | A1* | 11/2002 | Peterka | 380/278 |
| 2002/0174366 | A1* | 11/2002 | Peterka et al. | 713/201 |
| 2003/0225863 | A1* | 12/2003 | Kajino et al. | 709/219 |
| 2004/0179691 | A1* | 9/2004 | Hori et al. | 380/277 |
| 2006/0053081 | A1* | 3/2006 | Ito | 705/59 |
| 2006/0271996 | A1* | 11/2006 | Sato | 725/135 |
| 2007/0226500 | A1* | 9/2007 | Birrell et al. | 713/170 |
| 2008/0006683 | A1* | 1/2008 | Abe | 235/375 |
| 2008/0098226 | A1 | 4/2008 | Zokumasui | |
| 2008/0163378 | A1* | 7/2008 | Lee | 726/27 |
| 2009/0240947 | A1* | 9/2009 | Goyal et al. | 713/176 |
| 2009/0296934 | A1* | 12/2009 | Qing et al. | 380/277 |
| 2009/0307757 | A1* | 12/2009 | Groten | 726/4 |
| 2010/0011393 | A1* | 1/2010 | Lecomte et al. | 725/31 |
| 2010/0046931 | A1* | 2/2010 | Takao et al. | 386/124 |
| 2010/0061549 | A1* | 3/2010 | Seo et al. | 380/42 |
| 2010/0186092 | A1* | 7/2010 | Takechi et al. | 726/26 |
| 2010/0217837 | A1* | 8/2010 | Ansari et al. | 709/218 |
| 2011/0060669 | A1* | 3/2011 | Laves | 705/34 |

FOREIGN PATENT DOCUMENTS

| | | |
|---|---|---|
| JP | 2003-242282 | 8/2003 |
| JP | 2008-103988 | 5/2008 |
| JP | 2008-193431 | 8/2008 |

* cited by examiner

*Primary Examiner* — Michael Pyzocha
(74) *Attorney, Agent, or Firm* — Renner, Otto, Boisselle & Sklar, LLP

(57) ABSTRACT

When continuously reproducing a plurality of contents, a content reproducing apparatus determines whether or not a remaining time of an expiration date of a session key is shorter than a total reproduction time of the plurality of contents to be continuously content. When it is determined that the remaining time of the expiration date of the session key is shorter than the total reproduction time of the plurality of contents to be continuously reproduced, a new session key is acquired from a server, and then the plurality of contents are continuously reproduced, using the new session key. When it is determined that the remaining time of the expiration date of the session key is not shorter than the total reproduction time of the plurality of contents to be continuously reproduced, the plurality of contents are continuously reproduced, using the current session key without acquiring the new session key from the server. This can prevent the continuous reproduction of the plurality of contents from being stopped due to the acquisition processing of the session key when the plurality of contents are continuously reproduced.

13 Claims, 7 Drawing Sheets

CONTENT REPRODUCING APPARATUS AND PROGRAM OF THE SAME

BACKGROUND OF THE INVENTION

1. Field of the Invention

The present invention relates to a content reproducing apparatus that reproduces contents, using a cipher key.

2. Description of the Related Art

An AV amplifier has a function as an internet radio terminal, which can acquire content data (tune data) in a streaming form via Internet from an internet radio server to reproduce the data. The AV amplifier acquires a tune list from the server and displays the same, so that a user selects a desired tune to be reproduced from the tune list. The AV amplifier transmits an api key set by the server to the server to cause the server to generate a session key and acquires the session key from the server. The session key is a cipher key needed when the tune list and the tune data are acquired from the server. The session key has an expiration date, and when the session key expires, the AV amplifier needs to reacquire the session key from the server.

Now, consider a case where a plurality of pieces of tune data in the tune list are acquired from the server to continuously reproduce the same. For example, although since the session key was effective when the tune data of a first tune and a second tune was requested to the server, the tune data could be acquired without reacquiring the session key, the tune data of a third tune and later cannot be acquired, using the current session key, if the session key expires during the reproduction of the tune data of the second tune. In this case, the AV amplifier needs to temporarily stop the continuous reproduction of the tune data, and after the session key is reacquired from the server, the tune data of the third tune needs to be requested to the server to be acquired and be reproduced. Accordingly, the continuous reproduction is stopped in a period of time between the second tune and the third tune until the session key is reacquired, which gives the user an uncomfortable feeling.

In Japanese Patent Application Laid-Open No. 2008-103988, there is described a technique in which while the cipher key is updated when the expiration date approaches, even in an effective period, when a state where CPU loading is low is determined, a cipher key of a counterpart cipher communication apparatus with a smaller communication volume is searched to be updated. However, in this literature, no technique to solve the above-described problem in continuously reproducing a plurality of tunes is described.

SUMMARY OF THE INVENTION

An object of the present invention is to provide a content reproducing apparatus that prevents continuous reproduction from stopping due to acquisition processing of a cipher key when continuously reproducing a plurality of contents.

A content reproducing apparatus according to the preferred embodiment of the present invention comprises: an acquisition unit that acquires a cipher key with an expiration date from a server; a reproduction unit that reproduces a content, using the cipher key; and a determination unit that determines whether or not a plurality of contents can be continuously reproduced, using the current cipher key, when the reproduction unit continuously reproduces the plurality of contents. When it is determined that the plurality of contents cannot be continuously reproduced, using the current cipher key, the acquisition unit newly acquires the cipher key from the server, and then the reproduction unit continuously reproduces the plurality of contents, using the new cipher key, and when it is determined that the plurality of contents can be continuously reproduced, using the current cipher key, the acquisition unit does not acquire the new cipher key from the server, and the reproduction unit continuously reproduces the plurality of contents, using the current cipher key.

When it is determined that the plurality of contents cannot be continuously reproduced, using the current cipher key, the new cipher key is acquired from the server, and then the plurality of contents are continuously reproduced, using the new cipher key, which can prevent the cipher key from expiring during the continuous reproduction of the plurality of contents. On the other hand, when it is determined that the plurality of contents can be continuously reproduced, using the current cipher key, the new cipher key is not acquired from the server, which can reduce a number of times of communication, thereby preventing wasteful communication.

Preferably when the reproduction unit continuously reproduces the plurality of contents, the determination unit determines whether or not a remaining time of an expiration date of the cipher key is shorter than a total reproduction time of the plurality of contents to be continuously reproduced (or a reproduction time of the content to be reproduced last is excluded from the total reproduction time of the plurality of contents to be continuously reproduced), when it is determined that the remaining time of the expiration date of the cipher key is shorter than the total reproduction time of the plurality of contents to be continuously reproduced, the acquisition unit acquires the new cipher key from the server, and then the reproduction unit continuously reproduces the plurality of contents, using the new cipher key, and when it is determined that the remaining time of the expiration date of the cipher key is not shorter than the total reproduction time of the plurality of contents to be continuously reproduced, the acquisition unit does not acquire the new cipher key from the server, and the reproduction unit continuously reproduces the plurality of contents, using the current cipher key.

When the remaining time of the expiration date of the cipher key is shorter than the total reproduction time of the plurality of contents to be continuously reproduced, it is determined that the cipher key will expire during the continuous reproduction of the plurality of contents. Accordingly, the new cipher key is acquired from the server, and then the plurality of contents are continuously reproduced, using the new cipher key, which can prevent the cipher key from expiring during the continuous reproduction of the plurality of contents. On the other hand, when the remaining time of the expiration date of the cipher key is not shorter than the total reproduction time of the plurality of contents to be continuously reproduced, it is determined that the cipher key will not expire during the continuous reproduction of the plurality of contents. Accordingly, the new cipher key is not acquired from the server, which can reduce the number of times of communication, thereby preventing wasteful communication.

Preferably the content reproducing apparatus further comprises a calculation unit that calculates the remaining time of the expiration date of the cipher key, based on a time when the acquisition unit acquired the cipher key from the server, and a current time. The determination unit determines whether or not the remaining time of the expiration date of the cipher key calculated by the calculation unit is shorter than the total reproduction time of the plurality of contents to be continuously reproduced.

In this case, since the information of the remaining time of the expiration date of the cipher key need not be acquired from the server, the number of times of communication can be reduced, and the wasteful communication can be prevented.

Preferably the acquisition unit acquires information of the remaining time of the expiration date of the cipher key from the server, and the determination unit determines whether or not the remaining time of the expiration date of the cipher key acquired by the acquisition unit is shorter than the total reproduction time of the plurality of contents to be continuously reproduced.

In this case, the acquisition of the information of the remaining time of the expiration date of the cipher key from the server can increase accuracy in determining whether or not the remaining time of the expiration date of the cipher key is shorter than the total reproduction time of the plurality of contents to be continuously reproduced.

Preferably the content reproducing apparatus further comprises a calculation unit that calculates the remaining time of the expiration date of the cipher key, based on a time when the acquisition unit acquired the cipher key from the server, and a current time. The acquisition unit acquires information of the remaining time of the expiration date of the cipher key from the server, when the determination unit determines that the remaining time of the expiration date of the cipher key calculated by the calculation unit is shorter than the total reproduction time of the plurality of contents to be continuously reproduced, and that the remaining time of the expiration date of the cipher key acquired by the acquisition unit is shorter than the total reproduction time of the plurality of contents to be continuously reproduced, the determination unit determines that the remaining time of the expiration date of the cipher key is shorter than the total reproduction time of the plurality of contents to be continuously reproduced, and the content reproducing apparatus further comprises a correction unit that corrects the time when the acquisition unit acquired the cipher key from the server, based on a difference between the remaining time of the expiration date of the cipher key acquired by the acquisition unit and the remaining time of the expiration date of the cipher key calculated by the calculation unit.

In this case, the accuracy in determining whether or not the remaining time of the expiration date of the cipher key is shorter than the total reproduction time of the plurality of contents to be continuously reproduced can be increased.

DETAILED DESCRIPTION OF THE PREFERRED EMBODIMENTS

Figure 1:
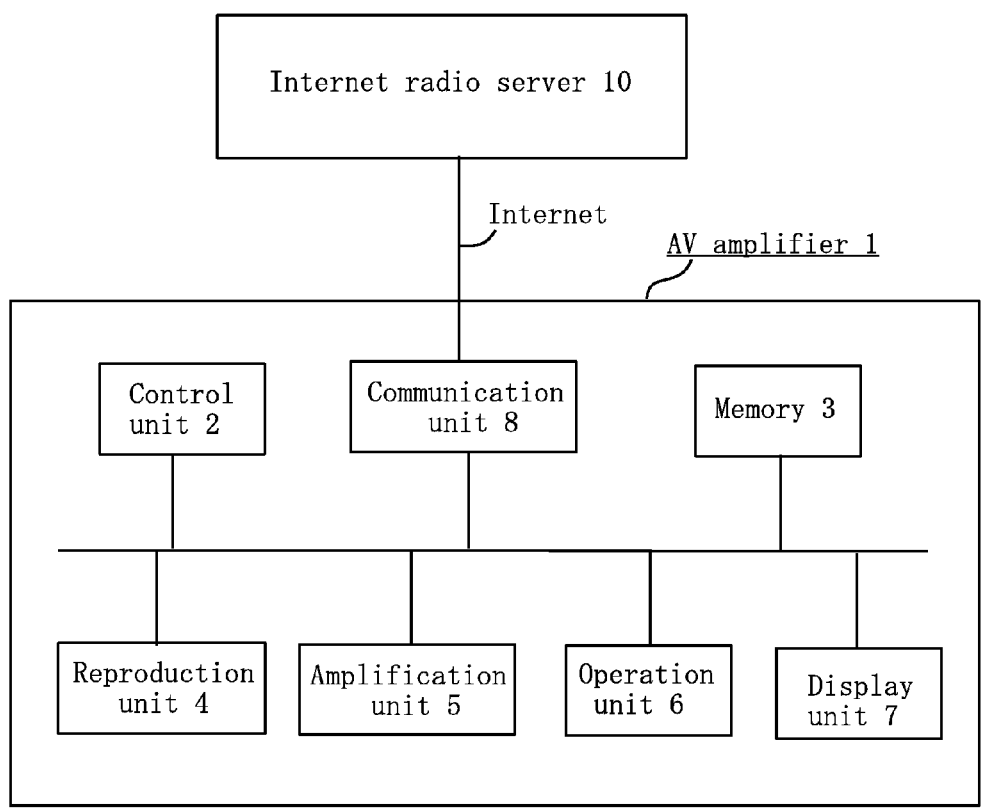
FIG. 1 is a block diagram showing a content reproducing apparatus (AV amplifier) according to a preferred embodiment of the present invention.

Hereinafter, while preferred embodiments of the present invention are specifically described with reference to the drawings, the present invention is not limited to these embodiments. As shown in FIG. 1, an AV amplifier 1, to which the content reproducing apparatus according to the embodiment of the present invention is applied, can be connected to an internet radio server (hereinafter, referred to as a server) 10 through an arbitrary electric communication line such as Internet. The AV amplifier 1 acquires content data from the server 10, for example, in a streaming form, and reproduces the same. The content data, which is a generic term for tune (music) data, video data, image data and the like, is tune data (a tune file) in the present example. The AV amplifier 1 receives a tune list, which is a list of tunes accumulated by the server 10, from the server 10 to cause a display unit to display the same. When a tune is selected from the tune list by user operation, the AV amplifier 1 continuously requests the tune data of the selected tune and subsequent tunes to the server, and acquires and reproduces the same. A session key (cipher key) is needed for the AV amplifier 1 to request the tune list and the tune data to the server 10 and acquire the same. The session key is acquired from the server 10 by transmitting an api key (permanent key with no expiration date) to the server. The session key has an expiration date, and when the session key expires, the AV amplifier 1 needs to reacquire a session key from the server 10.

The AV amplifier 1 includes a control unit 2, a memory 3 such as a ROM and a RAM, a reproduction unit 4, an amplification unit 5, an operation unit 6, a display unit 7, and a communication unit 8. The control unit 2 controls the respective units of the AV amplifier 1, and is a microcomputer, a CPU or the like. The control unit 2 reads and executes a content reproduction program stored in the ROM on the RAM to thereby execute processing described later.

The reproduction unit 4 reproduces the tune data received in the streaming form from the server 10. The reproduction includes decoding processing, D/A conversion processing and the like. The amplification unit 5 executes volume control processing and amplification processing to an audio signal of the tune data reproduced by the reproduction unit 4, and supplies the audio signal to a speaker externally connected, which is not shown.

The operation unit 6 receives user operation, and is operation buttons provided in a front panel of the AV amplifier 1, a remote controller and the like. The display unit 7 displays a tune list screen and the like, and is an LCD and the like. The display unit 7 may also perform OSD (On-Screen Display) of these screens on a display apparatus externally connected. The communication unit 8 communicates with the server 10 via Internet, and transmits a request for the tune list or the tune file to the server 10 and receives the tune list or the tune file from the server 10.

The control unit 2 determines whether or not all tunes to be continuously reproduced can be reproduced using a current session key, when a tune is selected from the tune list, and the tune data of the selected tune and subsequent tunes are continuously reproduced. Particularly, the control unit 2 compares a total reproduction time of all the tune data to be continuously reproduced (that is, a time required to finish reproducing all the tune data) and a remaining time of the expiration date of the session key to thereby determine whether or not the session key will expire during the continuous reproduction of the plurality of pieces of tune data. When the control unit 2 determines that the session key will expire during the continuous reproduction of the plurality of pieces of tune data, the control unit 2 requests a session key to the server and acquires the same before starting the continuous reproduction (i.e., before requesting the tune data of the first tune). Using the session key newly acquired, the control unit 2 starts the continuous reproduction of the tune data. This can prevent the session key from expiring during the continuous reproduction of the plurality of pieces of tune data. Moreover, when the control unit 2 determines that the session key will not expire during the continuous reproduction of the plurality of pieces of tune data, the control unit 2 starts the continuous reproduction of the tune data, using the current session key without acquiring the new session key from the server 10. Accordingly, a number of times of communication between the AV amplifier 1 and the server 10 can be reduced.

Figure 2:
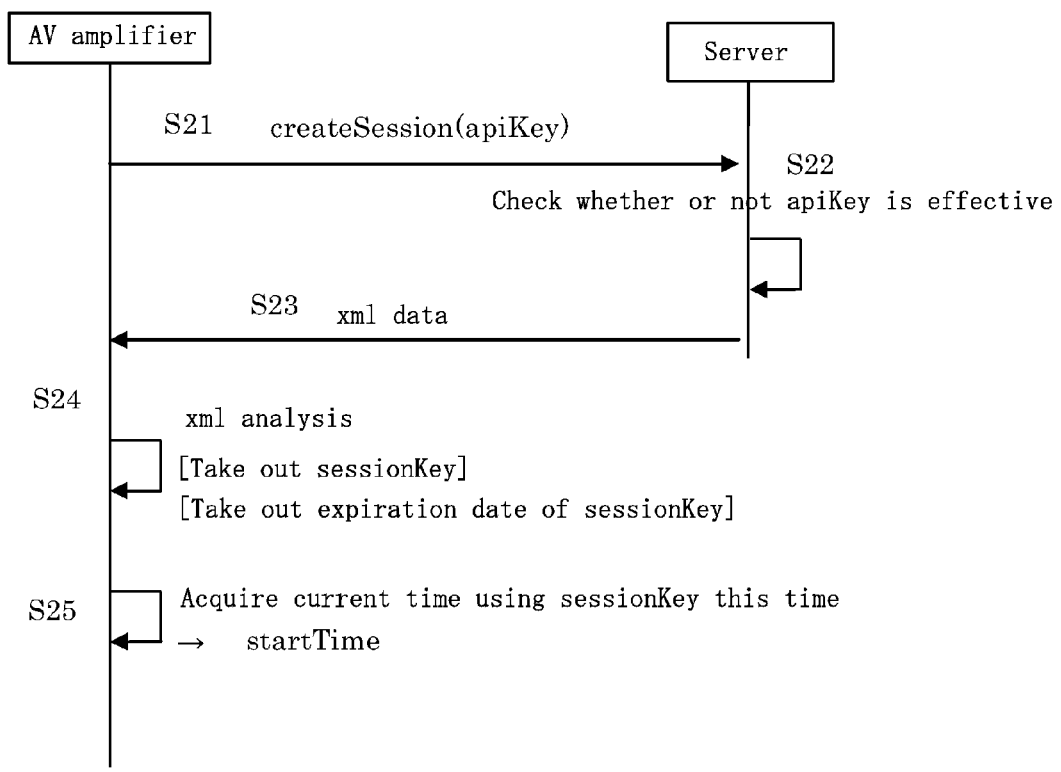
FIG. 2 is a sequence diagram showing acquisition processing of a session key.

Hereinafter, the operation of the present embodiment is described. FIG. 2 is a sequence diagram showing session key acquisition processing. The processing in FIG. 2 is processing when the AV amplifier 1 first acquires the session key from the server 10, or when the AV amplifier 1 reacquires the session key. The AV amplifier 1 transmits a command of "createSession" to the server 10 to request the session key (S21). The command of "createSession" includes the api key set by the AV amplifier 1. Upon receiving "createSession", the server 10 determines whether or not the api key is an effective key (S22). If the api key is not effective, the server 10 does not send back the session key. Here, since the api key is effective, the server 10 generates the session key from the api key, and generates XML data including the generated session key and information of the expiration date to send back the same to the AV amplifier 1 (S23). The expiration date of the session key is set to, for example, 6 hours (3600 seconds) after a generation time of the session key.

Upon receiving the XML data, the AV amplifier 1 analyzes the XML data, and extracts the session key and the information of the expiration date to store the same in memory 3 (S24). Moreover, when the AV amplifier 1 acquires a time when the session key is acquired from a clock processing unit not shown (e.g., in the case where it operates by an OS (operating system), an internal clock of the OS) in the AV amplifier 1, and stores the same as "startTime" in the memory 3 (S25).

Figure 3:
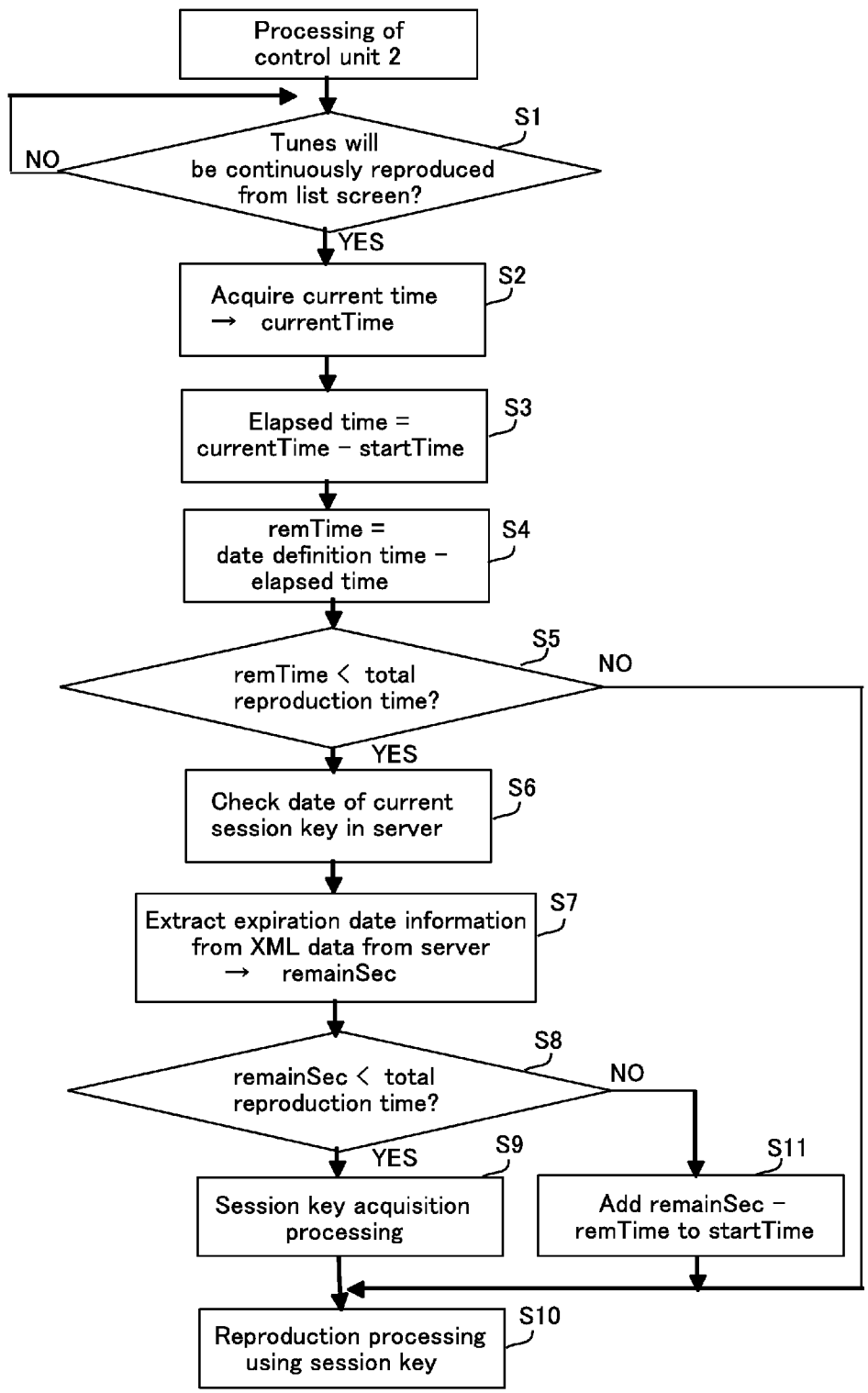
FIG. 3 is a flowchart showing processing of a control unit 2 when a plurality of tunes are continuously reproduced.

FIG. 3 shows processing of the control unit 2 of the AV amplifier 1 when the tunes in the tune list are continuously reproduced. One of the tunes is selected from the tune list, for example, by the user operation, and the control unit 2 determines whether or not an instruction to continuously reproduce the selected tune and the subsequent tunes has been inputted (S1). Alternatively, in place of the user operation, the control unit 2 may select an arbitrary tune list and continuously reproduce all tunes in the tune list.

If the tunes in the tune list are continuously reproduced (YES in S1), the control unit 2 first determines whether or not the remaining time of the expiration date of the session key is shorter than the total reproduction time of the tunes to be continuously reproduced, based on the time information managed on the AV amplifier 1 side (S2 to S5). Particularly, the control unit 2 acquires a current time from the clock processing unit and stores the same as "currentTime" in the memory 3 (S2). The control unit 2 calculates, by "currentTime"−"startTime", an elapsed time since a time when the current session key was acquired, and stores the same in the memory 3 (S3). The control unit 2 calculates a remaining time of the expiration date "remTime" by a date definition time− the elapsed time, and stores the same in the memory 3 (S4). The date definition time is an effective period of the session key, and for example, 6 hours (3600 seconds) as described above.

The control unit 2 determines whether or not "remTime" is shorter than the total reproduction time of the tunes to be continuously reproduced, that is, whether or not the session key will expire in the middle of the continuous reproduction (S5). Since a reproduction time of each of the tunes is included in the tune list acquired from the server 10 as one piece of metadata, the total reproduction time is found by adding all the reproduction times of the tunes to be continuously reproduced. If "remTime" is not shorter than the total reproduction time of the tunes to be continuously reproduced (NO in S5), the session key will not expire before the continuous reproduction of the tunes is finished. Accordingly, the control unit 2 does not acquire the new session key, but requests the tune data to the server 10 to acquire and reproduce the same, using the current session key (S10).

Particularly, the control unit 2 adds the current session key to "PlayURL", which is a URL of the tune acquired from the server in advance, and transmits a command of "getTrackStreamingData (PlayURL+sessionKey)" to the server 10. In response to this, the server 10 transmits the tune data specified by "Play URL" to the AV amplifier 1.

On the other hand, if "remTime" is shorter than the total reproduction time of the tunes to be reproduced (YES in S5), it is determined that the session key will expire before the continuous reproduction of the tunes is finished. In this case, the control unit 2 acquires the information of the remaining time of the expiration date of the session key from the server 10, and again determines whether or not the remaining time of the expiration date of the session key is shorter than the total reproduction time of the tunes to be continuously reproduced (S6 to S8). Particularly, the control unit 2 transmits a command of "getSessionInformation (sessionKey)" to the server 10 to request the information of the remaining time of the expiration date of the session key (S6). In response to this command, the server 10 sends back the XML data including the information of the remaining time of the expiration date of the session key to the AV amplifier 1. The control unit 2 extracts the information of the remaining time of the expiration date of the session key from the XML data, and stores the same in the memory 3 as "remainSec" (S7).

The control unit 2 determines whether or not "remainSec" is shorter than the total reproduction time of the tunes to be continuously reproduced, that is, whether or not the session key will expire in the middle of the continuous reproduction (S8). If "remainSec" is shorter than the total reproduction time of the tunes to be continuously reproduced (YES in S8), it is determined that the session key will expire before the continuous reproduction of the tunes is finished. In this case, the control unit 2 executes the processing for reacquiring the session key from the server 10. This processing is as described with reference to FIG. 2. The control unit 2 requests the tune data to the server 10, and acquires and reproduces the same, using the session key newly acquired (S10).

Particularly, the control unit 2 adds the session key newly acquired to "PlayURL", which is a URL of the tune acquired from the server in advance, and transmits the command of "getTrackStreamingData (PlayURL+sessionKEY)" to the server 10. In response to this, the server 10 transmits the tune data specified in "PlayURL" to the AV amplifier 1. Accordingly, this can prevent the session key from expiring before the continuous of reproduction of the tunes is finished.

On the other hand, if "remainSec" is not shorter than the total reproduction time of the tunes to be continuously reproduced (NO in S8), the current session key will not expire before the continuous reproduction of the tunes is finished. At this time, the control unit 2 corrects a value of "startTime" by adding "remainSec"−"remtime" to "startTime" stored in the memory 3. This enables "remTime" calculated based on "startTime" on the AV amplifier 1 side and "remainSec" managed on the server 10 side to be adjusted to substantially the same value, even if the count of the remaining time of the expiration date on the AV amplifier 1 side is misaligned with the count of the remaining time of the expiration date on the server 10 side. Thereafter, the control unit 2 requests the tune data to the server 10, and acquires and reproduces the same, using the current session key (S10).

Figure 4:
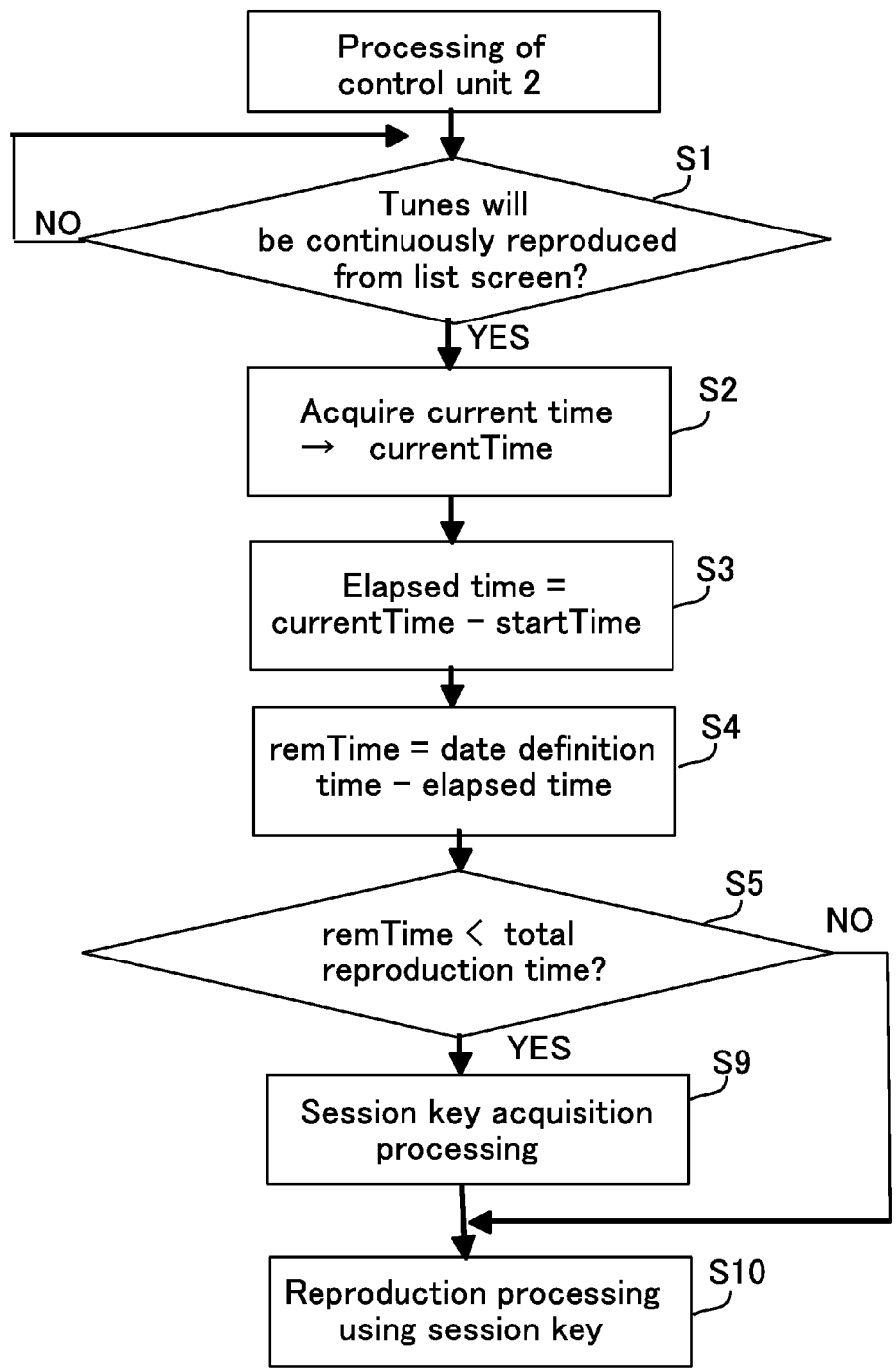
FIG. 4 is a flowchart showing processing of the control unit 2 when a plurality of tunes are continuously reproduced.
Figure 5:
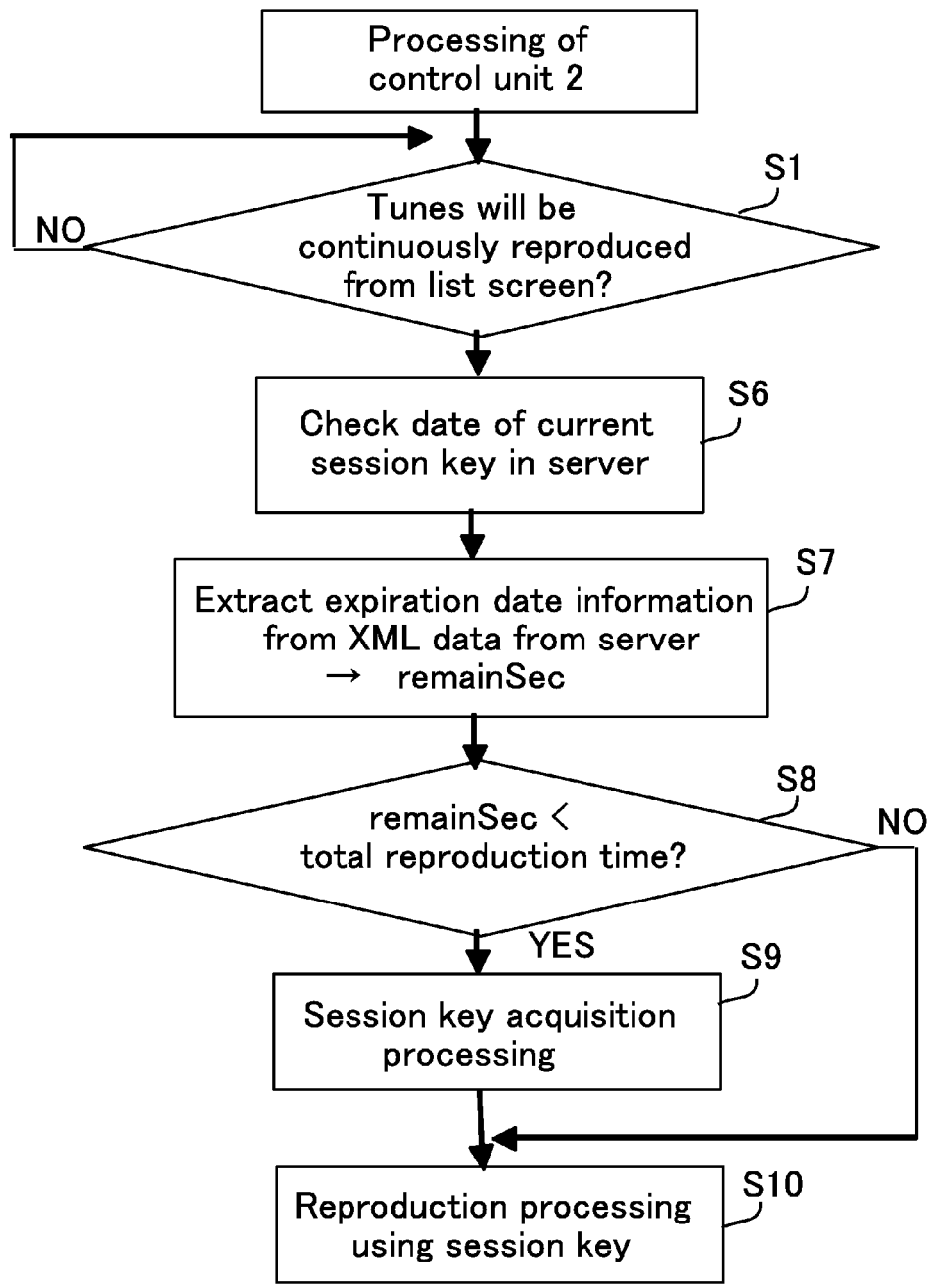
FIG. 5 is a flowchart showing processing of the control unit 2 when a plurality of tunes are continuously reproduced.

The above-described processing can prevent the continuous reproduction of the tunes from being stopped due to the runout of the remaining time of the expiration date of the session key in the middle of the continuous reproduction of the tunes. While in FIG. 3, the determination as to whether or not the remaining time of the expiration date of the session key is shorter than the total reproduction time of the tunes to be continuously reproduced is executed in two stages of the processing of determining by the remaining time of the expiration date of the session key calculated on the AV amplifier 1 side (S2 to S5), and the processing of determining by the remaining time of the expiration date of the session key managed on the server 10 side (S6 to S8), either one may be only executed. FIG. 4 shows the case of only the processing of determining by the remaining time of the expiration date of the session key calculated on the AV amplifier 1 side (S2 to S5), and FIG. 5 shows the case of only the processing of determining by the remaining time of the expiration date of the session key managed on the server 10 side (S6 to S8).

Figure 6:
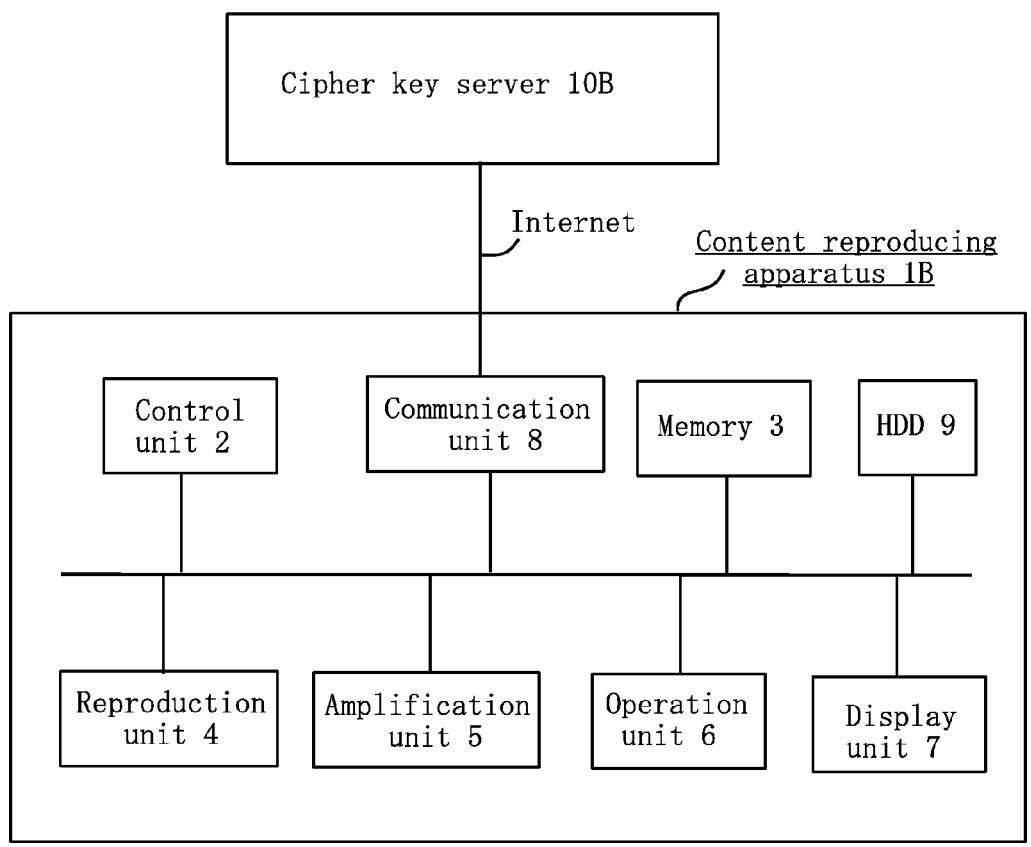
FIG. 6 is a block diagram showing a content reproducing apparatus according to another preferred embodiment of the present invention.

While as described above, the preferred embodiments of the present invention have been described, the present invention is not limited to these embodiments. For example, the present invention can be applied to, for example, a case where the content reproducing apparatus does not perform streaming reproduction of the tune data recorded on the server, but as shown in FIG. 6, a content reproducing apparatus 1B includes a recording medium such as an HDD 9, and records tune data (e.g., tune data downloaded) on the HDD 9, and a session key needs to be used when the tune data recorded on the HDD 9 is reproduced. In this case, a server 10B may be a cipher key server that merely executes generation and transmission of the session key. Moreover, in place of comparing the total reproduction time of all the tunes to be continuously reproduced and the expiration date of the session key, the resultant from excluding the reproduction time of the tune to be reproduced last from the total reproduction time of all the tunes to be continuously reproduced and the expiration date of the session key may be compared. This is because while the session key is needed when the last tune is requested to the server, the session key will not be used in a period from the reproduction start of the last tune to the reproduction end. However, it is more secure to compare the total reproduction time of all the tunes to be continuously reproduced and the expiration date of the session key.

Figure 7:
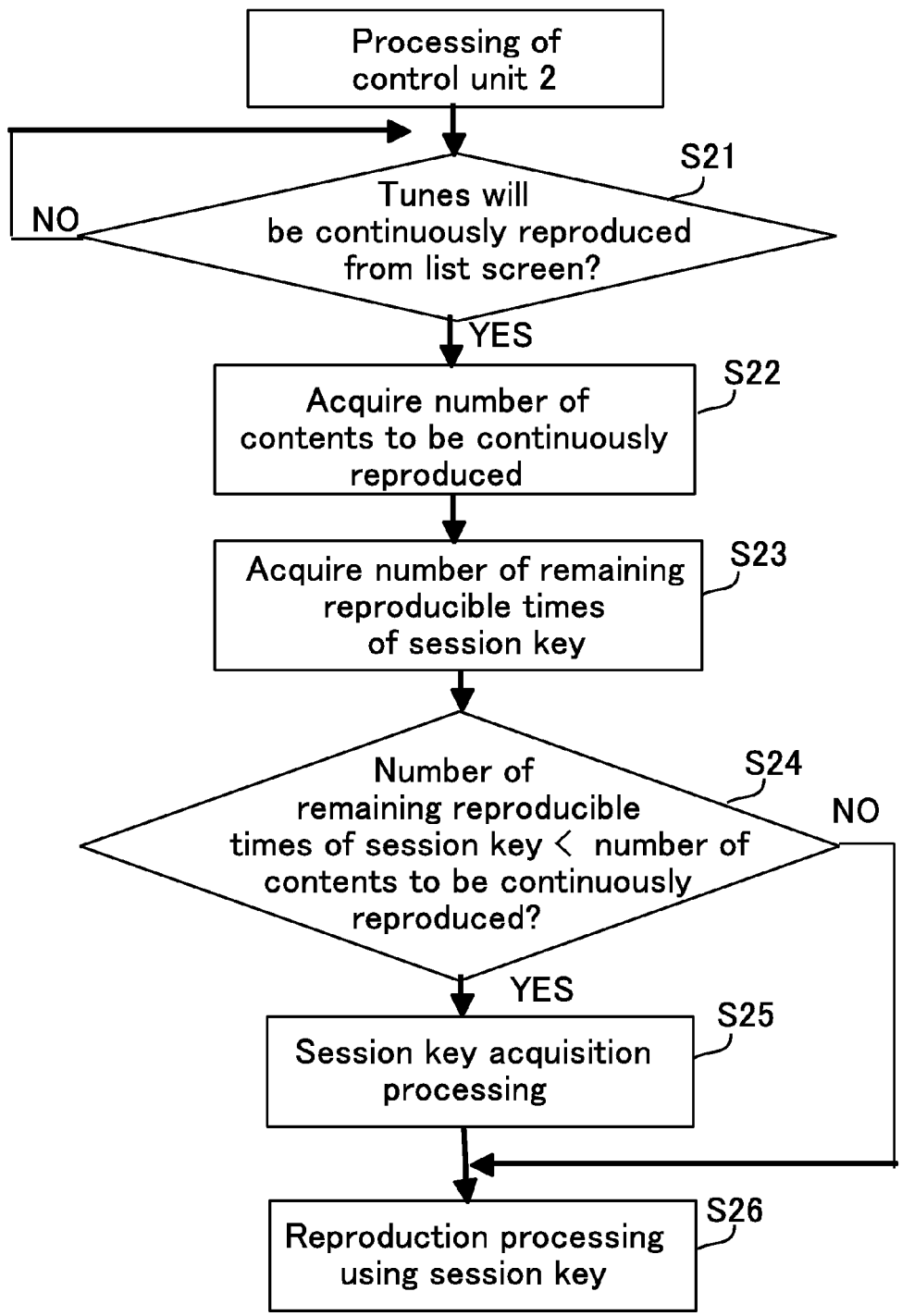
FIG. 7 is a flowchart showing processing of the control unit 2 when a plurality of tunes are continuously reproduced.

Moreover, as shown in FIG. 7, the present invention can be applied to a case where the session key is managed with a number of times of effective reproduction (a number of remaining reproducible times) in place of being managed with the expiration date (the remaining time). Every time one content is reproduced, the number of remaining reproducible times is updated on the memory so as to be reduced by one. When the plurality of tunes are continuously reproduced (YES in S21), the control unit 2 acquires a number of contents to be continuously reproduced from the list (S22), and acquires the number of remaining reproducible times of the session key from the memory (S23). The control unit 2 determines whether or not the number of remaining reproducible times of the session key is smaller than the number of contents to be continuously reproduced (S24). If smaller (YES in S24), the control unit 2 acquires the session key from the server (S25), and then continuously reproduces the plurality of contents, using the new session key (S26). If not smaller (NO in S24), the control unit 2 continuously reproduces the plurality of contents, using the current session key without acquiring the new session key from the server (S26).

The content reproducing apparatus may be a TV receiver, a cellular phone, a car navigation system, a portable player, a game machine or the like. The present invention may be provided in a form of a computer program to cause a computer to execute the operation of the above-described content reproducing apparatus or a recording medium that records the computer program.

What is claimed is:

1. A content reproducing apparatus comprising:
    an acquisition unit that acquires a first cipher key with an expiration from a server;
    a reproduction unit that reproduces a content, using the first cipher key; and
    a determination unit that determines whether or not a plurality of contents can be continuously reproduced, using the first cipher key, when the reproduction unit continuously reproduces the plurality of contents,
    wherein when it is determined that the plurality of contents cannot be continuously reproduced using the first cipher key because the first cipher key will expire during the continuous reproduction of the plurality of contents, the acquisition unit newly acquires a second cipher key from the server prior to the start of the continuous reproduction, even if the first cipher key is not yet expired, and then the reproduction unit continuously reproduces the plurality of contents, using the second cipher key, and
    when it is determined that the plurality of contents can be continuously reproduced using the first cipher key, the acquisition unit does not acquire the second cipher key from the server, and the reproduction unit continuously reproduces the plurality of contents using the first cipher key.

2. The content reproducing apparatus according to claim 1, wherein the expiration is an expiration date, and the determination unit determines whether or not a remaining time of an expiration date of the first cipher key is shorter than a total reproduction time of the plurality of contents to be continuously reproduced, or whether or not the remaining time of the expiration date of the first cipher key is shorter than a resultant time from excluding a reproduction time of the content to be reproduced last is excluded from the total reproduction time of the plurality of contents to be continuously reproduced,
    when it is determined that the remaining time of the expiration date of the first cipher key is shorter than the total reproduction time of the plurality of contents to be continuously reproduced, the acquisition unit acquires the second cipher key from the server, and then the reproduction unit continuously reproduces the plurality of contents, using the second cipher key, and
    when it is determined that the remaining time of the expiration date of the first cipher key is not shorter than the total reproduction time of the plurality of contents to be continuously reproduced, the acquisition unit does not acquire the second cipher key from the server, and the reproduction unit continuously reproduces the plurality of contents, using the first cipher key.

3. The content reproducing apparatus according to claim 2, further comprising a calculation unit that calculates the remaining time of the expiration date of the first cipher key, based on a time when the acquisition unit acquired the first cipher key from the server, and a current time,
    wherein the determination unit determines whether or not the remaining time of the expiration date of the first cipher key calculated by the calculation unit is shorter than the total reproduction time of the plurality of contents to be continuously reproduced.

4. The content reproducing apparatus according to claim 2, wherein the acquisition unit acquires information of the remaining time of the expiration date of the first cipher key from the server, and the determination unit determines whether or not the remaining time of the expiration date of the first cipher key acquired by the acquisition unit is shorter than the total reproduction time of the plurality of contents to be continuously reproduced.

5. The content reproducing apparatus according to claim 2, further comprising a calculation unit that calculates the remaining time of the expiration date of the first cipher key, based on a time when the acquisition unit acquired the first cipher key from the server, and a current time, wherein the acquisition unit acquires information of the remaining time of the expiration date of the first cipher key from the server, when the determination unit determines that the remaining time of the expiration date of the first cipher key calculated by the calculation unit is shorter than the total reproduction time of the plurality of contents to be continuously reproduced, and that the remaining time of the expiration date of the first cipher key acquired by the acquisition unit is shorter than the total reproduction time of the plurality of contents to be continuously reproduced, the determination unit determines that the remaining time of the expiration date of the first cipher key is shorter than the total reproduction time of the plurality of contents to be continuously reproduced, and the content reproducing apparatus further comprises a correction unit that corrects the time when the acquisition unit acquired the first cipher key from the server, based on a difference between the remaining time of the expiration date of the first cipher key acquired by the acquisition unit and the remaining time of the expiration date of the first cipher key calculated by the calculation unit.

6. The content reproducing apparatus according to claim 1, wherein the expiration is a number of remaining reproducible times, and the determination unit determines whether or not the number of remaining reproducible times of the first cipher key is smaller than a number of the plurality of contents to be continuously reproduced, when it is determined that the number of remaining reproducible times of the first cipher key is smaller than the number of the plurality of contents to be continuously reproduced, the acquisition unit acquires the second cipher key from the server, and then the reproduction unit continuously reproduces the plurality of contents, using the second cipher key, and when it is determined that the number of remaining reproducible times of the first cipher key is not smaller than the number of the plurality of contents to be continuously reproduced, the acquisition unit does not acquire the second cipher key from the server, and the reproduction unit continuously reproduces the plurality of contents, using the first cipher key.

7. A content reproducing method including:

an acquisition step that acquires a first cipher key with an expiration from a server;

a reproduction step that reproduces a content, using the first cipher key; and a determination step that determines whether or not a plurality of contents can be continuously reproduced using the first cipher key, when the reproduction step continuously reproduces the plurality of contents, wherein when it is determined that the plurality of contents cannot be continuously reproduced using the first cipher key because the first cipher key will expire during the continuous reproduction of the plurality of contents, the acquisition step newly acquires a second cipher key from the server prior to the start of the continuous reproduction, even if the first cipher key is not yet expired, and then the reproduction step continuously reproduces the plurality of contents, using the second cipher key, and when it is determined that the plurality of contents can be continuously reproduced using the first cipher key, the acquisition step does not acquire the second cipher key from the server, and the reproduction step continuously reproduces the plurality of contents using the first cipher key.

8. The content reproducing method according to claim 7, wherein the expiration is an expiration date, and the determination step determines whether or not a remaining time of an expiration date of the first cipher key is shorter than a total reproduction time of the plurality of contents to be continuously reproduced, or whether or not the remaining time of the expiration date of the first cipher key is shorter than a resultant time from excluding a reproduction time of the content to be reproduced last is excluded from the total reproduction time of the plurality of contents to be continuously reproduced, when it is determined that the remaining time of the expiration date of the first cipher key is shorter than the total reproduction time of the plurality of contents to be continuously reproduced, the acquisition step acquires the second cipher key from the server, and then the reproduction step continuously reproduces the plurality of contents using the second cipher key, and when it is determined that the remaining time of the expiration date of the first cipher key is not shorter than the total reproduction time of the plurality of contents to be continuously reproduced, the acquisition step does not acquire the second cipher key from the server, and the reproduction step continuously reproduces the plurality of contents, using the first cipher key.

9. The content reproducing method according to claim 8, further including a calculation step that calculates the remaining time of the expiration date of the first cipher key, based on a time when the acquisition step acquired the first cipher key from the server, and a current time, wherein the determination step determines whether or not the remaining time of the expiration date of the first cipher key calculated by the calculation step is shorter than the total reproduction time of the plurality of contents to be continuously reproduced.

10. The content reproducing method according to claim 8, wherein the acquisition step acquires information of the remaining time of the expiration date of the first cipher key from the server, and the determination step determines whether or not the remaining time of the expiration date of the first cipher key acquired by the acquisition step is shorter than the total reproduction time of the plurality of contents to be continuously reproduced.

11. The content reproducing method according to claim 8, further including a calculation step that calculates the remaining time of the expiration date of the first cipher key, based on a time when the acquisition step acquired the first cipher key from the server, and a current time, wherein the acquisition step acquires information of the remaining time of the expiration date of the first cipher key from the server, when the determination step determines that the remaining time of the expiration date of the first cipher key calculated by the calculation step is shorter than the total reproduction time of the plurality of contents to be continuously reproduced, and that the remaining time of the expiration date of the first cipher key acquired by the acquisition step is shorter than the total reproduction time of the plurality of contents to be continuously reproduced, the determination step determines that the remaining time of the expiration date of the first cipher key is shorter than the total reproduction time of the plurality of contents to be continuously reproduced, and the content reproducing method further includes a correction step that corrects the time when the acquisition step acquired the first cipher key from the server, based on a difference between the remaining time of the expiration date of the first cipher key acquired by the acquisition step and the remaining time of the expiration date of the first cipher key calculated by the calculation step.

12. The content reproducing method according to claim 7, wherein the expiration is a number of remaining reproducible times, and the determination step determines whether or not the number of remaining reproducible times of the first cipher key is smaller than a number of the plurality of contents to be continuously reproduced, when it is determined that the number of remaining reproducible times of the first cipher key is smaller than the number of the plurality of contents to be continuously reproduced, the acquisition step acquires the second cipher key from the server, and then the reproduction step continuously reproduces the plurality of contents, using the second cipher key, and when it is determined that the number of remaining reproducible times of the first cipher key is not smaller than the number of the plurality of contents to be continuously reproduced, the acquisition step does not acquire the second cipher key from the server, and the reproduction step continuously reproduces the plurality of contents, using the first cipher key.

13. A computer program stored on a non-transitory computer-readable medium causing a computer in a content reproducing apparatus to perform:

an acquisition step that acquires a first cipher key with an expiration date from a server;

a reproduction step that reproduces a content, using the first cipher key; and a determination step that determines whether or not a plurality of contents can be continuously reproduced, using the first cipher key, when the reproduction step continuously reproduces the plurality of contents, wherein when it is determined that the plurality of contents cannot be continuously reproduced using the first cipher key because the first cipher key will expire during the continuous reproduction of the plurality of contents, the acquisition step newly acquires a second cipher key from the server prior to the start of the continuous reproduction, even if the first cipher key is not yet expired, and then the reproduction step continuously reproduces the plurality of contents, using the second cipher key, and when it is determined that the plurality of contents can be continuously reproduced, using the first cipher key, the acquisition step does not acquire the second cipher key from the server, and the reproduction step continuously reproduces the plurality of contents, using the first cipher key.

* * * * *